(12) United States Patent
Ramsay et al.

(10) Patent No.: US 11,130,885 B2
(45) Date of Patent: Sep. 28, 2021

(54) PROTRUSION PATCH, METHOD OF INSTALLATION AND USE, AND MEASUREMENT OF QUALITY

(71) Applicant: Fer-Pal Construction Ltd., Toronto (CA)

(72) Inventors: Gerry Ramsay, Mississauga (CA); Kendrick Shaun McKaigue, Bradford (CA)

(73) Assignee: Fer-Pal Construction Ltd., Toronto (CA)

( * ) Notice: Subject to any disclaimer, the term of this patent is extended or adjusted under 35 U.S.C. 154(b) by 0 days.

(21) Appl. No.: 16/866,963

(22) Filed: May 5, 2020

(65) Prior Publication Data

US 2020/0332151 A1    Oct. 22, 2020

Related U.S. Application Data

(62) Division of application No. 15/842,339, filed on Dec. 14, 2017, now Pat. No. 10,669,453.

(Continued)

(51) Int. Cl.
| | |
|---|---|
| *F16L 55/16* | (2006.01) |
| *C09J 7/38* | (2018.01) |
| *C09J 7/21* | (2018.01) |
| *C09J 7/25* | (2018.01) |
| *C09J 7/24* | (2018.01) |

(Continued)

(52) U.S. Cl.
CPC . *C09J 7/38* (2018.01); *C09J 7/21* (2018.01); *C09J 7/243* (2018.01); *C09J 7/25* (2018.01); *C09J 7/255* (2018.01); *F16L 55/163* (2013.01); *F16L 55/179* (2013.01); *F16L 55/18* (2013.01); *C09J 2301/18* (2020.08); *C09J 2400/10* (2013.01); *C09J 2400/143* (2013.01); *C09J 2400/263* (2013.01); *C09J 2423/046* (2013.01); *C09J 2463/00* (2013.01); *C09J 2467/006* (2013.01); *C09J 2475/006* (2013.01); *F16L 55/1654* (2013.01); *F16L 55/1656* (2013.01)

(58) Field of Classification Search
CPC ....... F16L 41/10; F16L 55/165; F16L 55/179; F16L 55/265
USPC ..................... 138/97, 98; 264/267, 269, 516, 264/36.15–17; 156/293, 294, 287, 267
See application file for complete search history.

(56) References Cited

U.S. PATENT DOCUMENTS

| | | | | |
|---|---|---|---|---|
| 4,386,629 | A | ‡ | 6/1983 | Cook ...................... F16L 47/22 138/103 |
| 5,609,439 | A | ‡ | 3/1997 | Schreiner .................. E03F 3/06 156/156 |

(Continued)

FOREIGN PATENT DOCUMENTS

| | | | |
|---|---|---|---|
| CA | 2361960 A2 | ‡ | 5/2002 |
| CA | 2361960 A2 | | 5/2002 |

*Primary Examiner* — Patrick F Brinson
(74) *Attorney, Agent, or Firm* — Kramer Amado (57) ABSTRACT

A patch is provided and described that can be used with the installation of a cured-in-place structural liner in a conduit when the conduit has protrusions into the conduit. The patch is made with similar material to the liner, or felt, and is impregnated with epoxy. The patch may be shaped to more closely match the anticipated curve of the outer surface of the liner. Tools for the installation of the patches, a method of use, and tools for measuring the quality of the installation of the patch before the installation of the structural liner, are also described.

17 Claims, 9 Drawing Sheets

Related U.S. Application Data

(60) Provisional application No. 62/434,206, filed on Dec. 14, 2016.

(51) Int. Cl.
    *F16L 55/163*     (2006.01)
    *F16L 55/18*     (2006.01)
    *F16L 55/179*     (2006.01)
    *F16L 55/165*     (2006.01)

(56) References Cited

U.S. PATENT DOCUMENTS

| | | | |
|---|---|---|---|
| 6,641,688 B1 ‡ | 11/2003 | Gearhart | F16L 55/179 138/97 |
| 8,272,406 B2 ‡ | 9/2012 | McKaigue | F16L 41/10 138/98 |
| 2002/0083990 A1 ‡ | 7/2002 | Lundman | F16L 55/1645 138/98 |
| 2015/0362115 A1 ‡ | 12/2015 | Arnold | F16L 55/162 138/98 |

‡ imported from a related application

PROTRUSION PATCH, METHOD OF INSTALLATION AND USE, AND MEASUREMENT OF QUALITY

CROSS-REFERENCE TO RELATED APPLICATIONS

This application is a divisional of parent U.S. application Ser. No. 15/842,339, filed on Dec. 14, 2017, which claims priority to Provisional U.S. Patent Application No. 62/434,206, filed on Dec. 14, 2016. The entire disclosure of each prior application is hereby incorporated by reference in its entirety.

FIELD OF THE INVENTION

The invention described herein generally relates to devices to create a better seal around protrusions into a conduit when installing a cured-in-place liner and methods of their use. The invention also encompasses instruments to install these devices, and instruments to measure the quality of their installation.

BACKGROUND OF THE INVENTION

Conduits for fluids, such as water or sewage conduits, or gas or chemical pipe, deteriorate over time. For example, many of the water mains throughout North America are made from unlined cast-iron pipe, the preferred material for water distribution systems up to the mid-1970's and beyond. Over time such pipes will deteriorate, often due to corrosion, becoming pitted and forming tubercules. This corroded material, in combination with mineral deposits, is known as encrustation and tuberculation.

Such deterioration results in leakage of the fluids, such as water or sewage, into the surrounding environment. For example, in 2013, Toronto experienced approximately 1700 water main breaks. These cause drops water pressure drops, and the leaking fluids can weaken the surrounding ground and can interfere with other underground systems, such as communication systems or other water or fluid bearing conduits. Such conduits need to be rehabilitated.

One approach to rehabilitation is to replace the deteriorated conduit. However, this can be a very costly and labour-intensive exercise; for example, if the conduit is a buried water pipe, replacement involves setting up a work area and digging up the pipe, known as "open-cut replacement".

One solution is to deploy a cured-in-place structural liner within the conduit. For example, Canadian patent no. 2,361,960 of Mercier describes the use of a cured-in-place structural liner. The liner consists of two concentric tubular jackets (an outer and an inner jacket) made of a flexible material that are impregnated with an adhesive resin. Bonded to the inner surface of the inner jacket is a film that is impermeable to liquid to flow through the conduit. The liner is inserted into one end of a dry conduit and then pulled into place. A shaping step then occurs, where the liner is made to conform to the inner wall of the conduit. The liner is then cured in place by flowing heated water through the conduit. This causes the liner to become a rigid structure, bonded to the inner surface of the conduit.

In one example, such an approach results in a conduit lined with a polyurethane and fabric liner, typically 1/16 to 1/4 of an inch thick, which is sealed in place with epoxy.

When rehabilitated conduits using a cured-in-place liner system, a goal is to create a "structural liner"—a liner that has sufficient structural and functional integrity that it will function as a replacement conduit even if the original conduit totally fails. A difficulty in using a cured-in place liner in a conduit is protrusions into the conduit, for example for service connections. When the liner is inserted, inflated and cured, a void may be created around the protrusion.

The presence of a void might leave the service able to work free, decreasing the water tightness of the seal and ultimately raising the possibility of the service becoming detached from the structural liner. The cured-in-place liner is supposed to last for decades in constant use.

Clients are increasingly insisting upon quality metrics for conduits after they have been rehabilitated by a cured in pipe system.

SUMMARY OF THE INVENTION

Embodiments of the invention are directed towards a patch, placed around the protrusion before (or as the first step of) a cured-in-pipe liner installation. The patch consists of a flexible material saturated with epoxy. The liner material is ideally the same material as that used in the cured-in-place liner, although other materials may be acceptable. Since the patch is structured around a piece of liner, the epoxy used can be identical in hardener to resin ratio as the epoxy generally used in the cured-in-place liner installation.

During installation, the patch itself fills at least part of the potential void around the protrusion. Ideally, any remaining space is filled with epoxy. Together, the patch and epoxy fill the void and strengthen the bond between the structural liner and the protrusion.

The patch may be shaped, through the use of layers of different sizes and also the use of tapered edges, to more fully fill the potential void around the protrusion.

The patch needs to be installed on the protrusion before the cured-in-pipe installation process can begin. Instruments are described for this installation.

If the hole in the patch is sized close to the diameter of the service and the service has threads, then the flexible material in the patch will engage with the threads of the service.

After the patch has been installed on the protrusion and before the installation of the cured-in-place liner, it may be useful to measure the quality of the installation of the patch. Instruments are described for this purpose, which generally measure either the distance up the protrusion the patch has been rotated or pushed, or the number of threads up which the patch has been rotated or pushed.

In accordance with one embodiment of the present invention, there is provided a patch for use with the installation of a cured-in-place structural liner in a conduit with a protrusion, comprising at least one piece of flexible material impregnated with epoxy, the patch having a hole pierced through, said hole closely matching the diameter of the protrusion. In a feature of the invention, the at least one piece of flexible material is made from felt, polyurethane, polyethylene, polyester, glass fiber, a carbonaceous fiber, or a blend of these materials. In a further feature of this embodiment, the at least one piece of material is made from the same material as the liner. In another feature of this embodiment, there are at least two pieces of flexible material and the at least two pieces of flexible material are stacked and have an equal or decreasing diameter of the layers moving down the service, thus forming a pyramidal shape. In still another feature of this embodiment, at least one edge of at least one of the flexible pieces of material is tapered.

In another embodiment of the invention, there is provided a method for rehabilitating a conduit having at least one service connected into the conduit and protruding into the conduit, comprising: providing a patch comprising at least one piece of a first flexible material impregnated with a first epoxy, the patch having a hole pierced through, said hole closely matching the diameter of the service protruding into the conduit; installing the patch onto the service protruding into the conduit to form a ring around the conduit; and installing a cured-in-place structural liner. In a feature of this embodiment, the method further comprises a step between the step of installing the patch onto the service protruding into the conduit and the step of installing a cured-in-place structural liner of: checking the quality of the installation of the patch onto the service protruding into the conduit.

In another feature of this embodiment, where the service has threads on the portion of the service protruding into the conduit, the method further comprises: a step before the installation of the patch onto the service of counting the length of threads on the portion of the service protruding into the conduit and a step after the installation of the patch onto the service of counting the length of threads on the portion of the service protruding into the conduit engaged by the patch. In still another feature of this embodiment the method further comprises, before the step of installing a cured-in-place structural liner, the step of: providing a liner for covering the inner surface of the tubular conduit, the liner being made of a second flexible material capable of being impregnated with a second curable epoxy and having a film made of a material impermeable to liquid bonded onto the inner surface of the liner, where the first flexible material and the second flexible material are the same material. In still another feature of this embodiment the method further comprises, the additional steps of: the liner being pulled through the conduit; the liner being inflated, and shaped to conform to the inner surface of the conduit; curing the first epoxy and the second epoxy; opening the liner; and opening the service.

In another feature of this embodiment, the step of installing the patch onto the service protruding into the conduit comprises: aligning the hole in the patch with the service; and rotating the patch onto the service. In still another feature of this embodiment, where the service has threads on the portion of the service protruding into the conduit, the step of rotating the patch onto the service comprises rotating the patch onto the service so the at least one piece of a first flexible material engages the threads of the service. In still another feature of this embodiment, the method of claim 12 further comprises the step of: pushing the patch against the inner surface of the conduit.

In another feature of this embodiment, the service has threads on the portion of the service protruding into the conduit and the step of installing the patch onto the service protruding into the conduit comprises: aligning the hole in the patch with the service; and pushing the patch onto the service so the at least one piece of a first flexible material engages the threads of the service. In still another feature of this embodiment, the method further comprises the step of: pushing the patch against the inner surface of the conduit.

In another embodiment of the invention, there is provided a rehabilitated conduit having at least one service connected into the conduit and protruding into the conduit comprising: a liner made of a first flexible material impregnated with a first curable epoxy and having a film made of a material impermeable to liquid bonded onto the inner surface of the liner, the liner being bonded to the inner surface of the conduit; a patch comprising at least one piece of a second flexible material impregnated with a second curable epoxy, the patch having a hole pierced through and the patch being placed to form a ring around the service; said first curable epoxy and said second curably epoxy having been cured; and said patch being bonded to the liner and the service. In a feature of this embodiment, the service has threads on the portion of the service protruding into the conduit and the at least one piece of a second flexible material engages with the threads. In another feature of this embodiment, the patch, liner and service form a unitary structure.

In another embodiment of the invention, there is provided a tool for the installation of a patch around a service, comprising: a holder that is sized to hold the patch, said holder interfacing the with patch along a grooved surface that is sized to approximately match or be smaller than the diameter of the service, and said holder having a central tapered section sized to fit into the service; a base with a first screw pierced therethrough supporting the holder and with the base biased away from the holder by a first spring; the base having a plurality of second screws pierced therethrough and pushing against the patch, the base being based away from the patch by a plurality of second springs; and the plurality of second springs having a larger spring constant than the first spring.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. Those of skill in the art understand that other embodiments may be utilized and structural changes may be made without departing from the scope of the present invention. Likewise, a reasonably broad scope for claimed or covered subject matter is intended. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Figure 12:
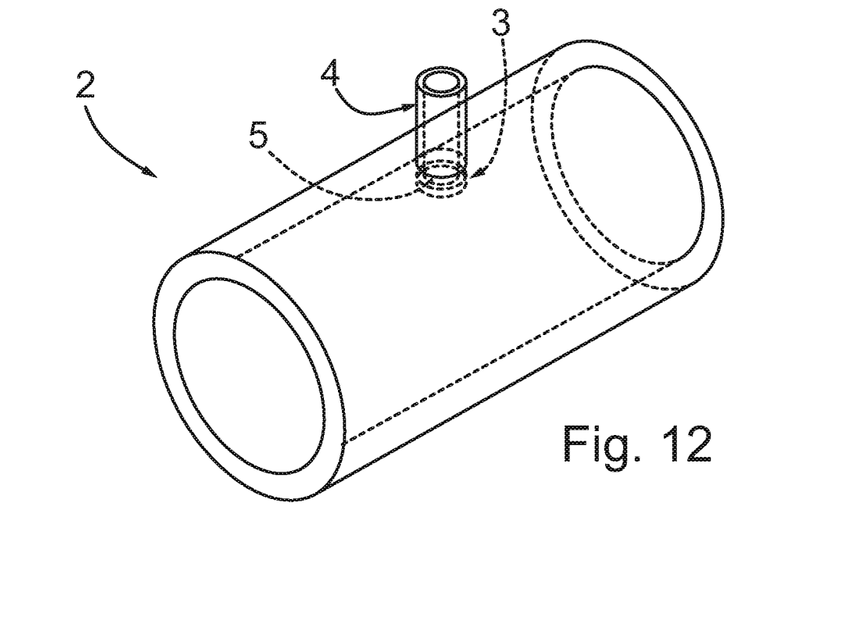
FIG. 12 illustrates a conduit with a service.

A typical conduit with a service that protrudes into the conduit is illustrated in FIG. 12. Turning to FIG. 12, there is a conduit or host pipe 2 that has a service 4. A portion 3 of the service 4 protrudes into the conduit. Portion 3 has threads 5.

When rehabilitating conduits using a cured-in-place liner system, a goal is to create a "structural liner"—a liner that has sufficient structural and functional integrity that it will function as a replacement conduit even if the original conduit totally fails. A difficulty in using a cured-in place liner in a conduit is protrusions into the conduit, for example for service connections. When the liner is inserted, inflated and cured, a void may be created around the protrusion.

Figure 1:
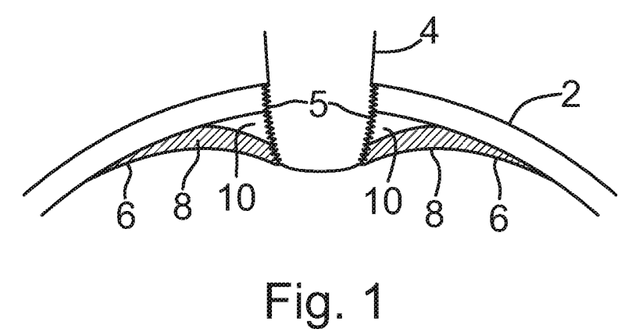
FIG. 1 illustrates the potential formation of a void around a service during the installation of a cured-in-place structural liner.
Figure 4:
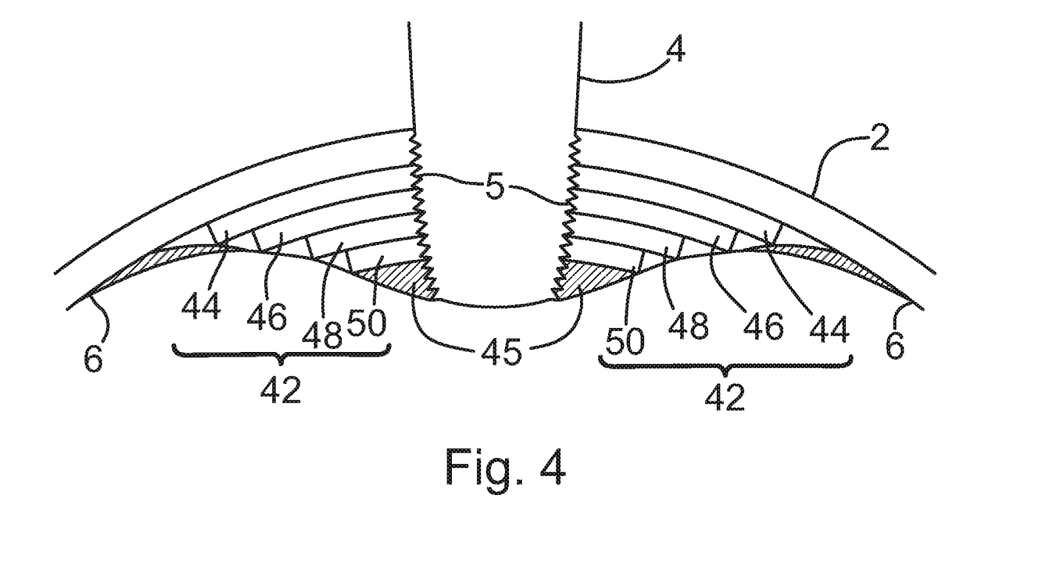
FIG. 4 illustrates a multi-layer patch with different sized layers and its use around a service during the installation of a cured-in-place structural liner.

FIG. 1 illustrates this problem. Turning to FIG. 1, there is a host pipe 2 and a service 4 with threads 5. A cured-in-place liner is installed, with outer jacket 6 and an epoxy layer 8. As seen in FIG. 4, this can create a void 10 surrounding the service 4.

The invention is a patch, placed around the protrusion (or forming a ring around the protrusion where the ring does not have to be circular) before or as the first step of a cured-in-pipe liner installation. The patch consists of a flexible material saturated with epoxy. The flexible material is ideally the same material as that used in the cured-in-place liner, although other materials may be acceptable. Since the patch is structured around a piece of material which is often identical to the liner, the epoxy used can be identical in hardener to resin ratio as the epoxy generally used in the cured-in-place liner installation.

In one example, the patch is made from a woven textile, which in a preferred embodiment is polyurethane or polyethylene or a blend of the two. An epoxy with a resin to hardener ratio of 3:1 may be used. The woven textile may also be polyester, glass fiber or a carbonaceous fiber. In another embodiment, the patch uses the same epoxy and liner material as used in the Aqua-Pipe™ liner. In another example, the patch is made of felt, and uses the epoxy as used in the Aqua-Pipe™ liner. In another example, the patch is made of felt, and the epoxy used in the patch is different from the epoxy used in the liner installation. If an epoxy different from that used in the liner installation is to be used, it generally should be more viscous than the epoxy used in the liner installation.

Figure 2:
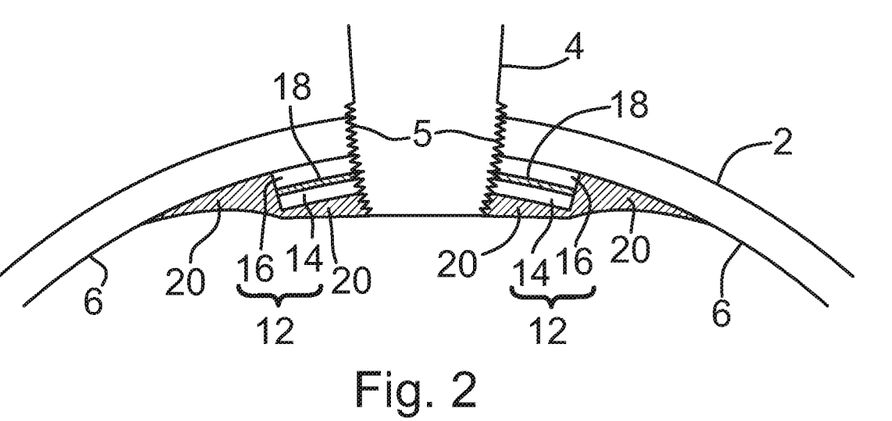
FIG. 2 illustrates a two layer patch and its use around a service during the installation of a cured-in-place structural liner.

A simple version of the patch is illustrated in FIG. 2. Turning to FIG. 2, the patch 12 consists of an inner layer 14, an outer layer 16, with epoxy 18 in between inner layer 14 and outer layer 16, and saturates inner layer 14, and outer layer 16. The patch 12 fills in part of (and ideally fully fills) the void 10 from FIG. 1. Ideally, any remaining void space is filled with epoxy as part of the cured-in-place installation process. When cured, the epoxy 20 will harden bonding the patch 12 to the liner outer jacket 6. The patch 12 is designed to snugly fit around the threads 5 on the service 4. When the epoxy 20 (and 18) is cured, patch 12 will be strongly connected to both threads 5 and outer jacket 6.

It is important to note that with this approach, the void 10 is partially (and preferably mainly) filled with the flexible material of inner layer 14 and outer layer 16, strengthening (after curing) the bonds between the service, the patch, and the outer jacket 6. Depending on the type of patch and installation, as described below, threads 5 can engage the flexible material of inner layer 14 and outer layer 16, strengthening (after curing) the bonds between the service, the patch, and the outer jacket 6. After curing, the service, patch and outer jacket should form a unitary structure.

Although FIG. 2 shows a patch with two layers, a patch can have just one layer. However, a multi-layer patch is preferred.

Figure 3:
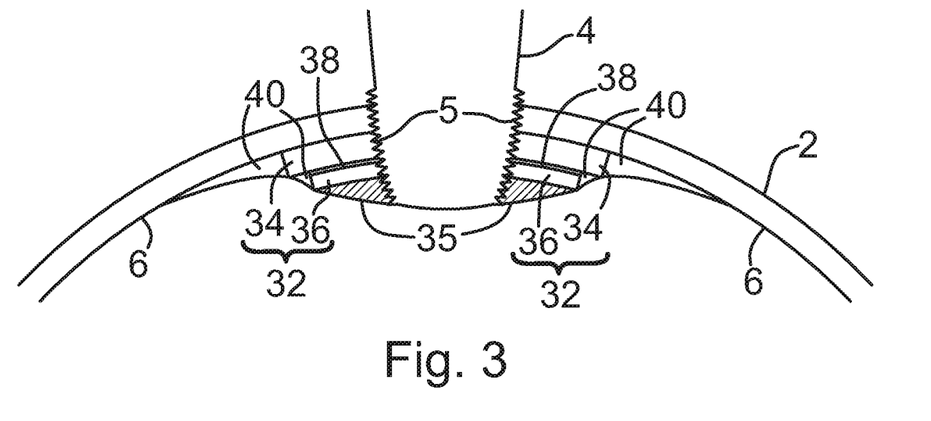
FIG. 3 illustrates a two layer patch with different sized layers and its use around a service during the installation of a cured-in-place structural liner.

The patch can be designed to better fill void 10 from FIG. 1. Turning to FIG. 3, the patch 32 consists of a layer 34 and a smaller layer 36 with epoxy 38 in between layer 34 and smaller layer 36, and saturates layers 34 and 36. As may be seen in FIG. 3, Patch 32 more completely fills void 10 from FIG. 1 leaving a lesser void 40. Ideally lesser void 40 is filled with epoxy 35 as part of the general installation of the cured-in-place pipe. By reducing the abrupt change in shape or profile between the outer jacket 6 and the patch, epoxy will be more evenly distributed and flow better and will be less likely to clump and not be fully distributed.

This approach may be further extended by using several layers to more closely approach the smooth curve of outer jacket 6. Turning to FIG. 4, a patch 42 is installed around a service 4. The patch 42 consists of layers 44, 46, 48 and 50, which become smaller (in diameter) as one moves down service 4. As with the previous patches, the layers are saturated with epoxy.

Due to the decreasing diameter of the layers as one moves down the service, patch 42 more closely approaches and approximates the curve of outer jacket 6, resulting in epoxy 45 being more evenly distributed, flowing better and will be less likely to clump and not be fully distributed. This decreasing diameter of the layers as one moves down the service may be described as a pyramidal shape. A pyramidal shape also includes the layers having an equal or decreasing diameter as the layers move down the service.

While more closely approximating the curve of outer jacket 6 is generally desirable, this extended approach is particularly useful when the service 4 protrudes to a greater distance into the host pipe 2. Recall that the person rehabilitating the pipe does not control the length of the protrusions encountered. When the protrusion is longer, this may be compensated by simply adding more layers to the patch.

Figure 5:
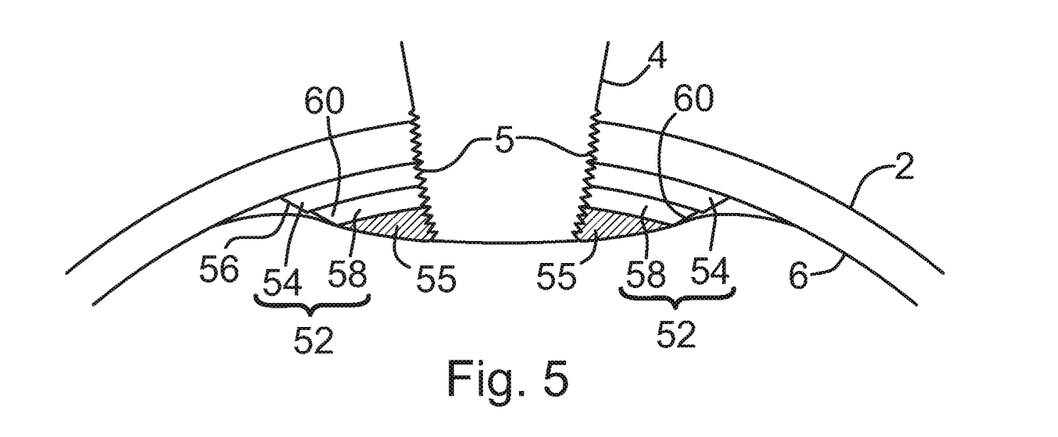
FIG. 5 illustrates a multi-layer patch with different sized layers and tapered edges and its use around a service during the installation of a cured-in-place structural liner.

In an alternative embodiment, the curve of inner jacket 6 is more closely approximated by tapering the edges of the layers in the patch. Turning to FIG. 5, patch 52 has layer 54 with tapered edge 56 and layer 58 with tapered edge 60. If appropriately designed, patch 52 will more closely approach and approximate the curve of outer jacket 6, resulting in epoxy 55 being more evenly distributed, flowing better and will be less likely to clump and not be fully distributed.

Additional tapered layers may be added to patch 52, as discussed above in relation to non-tapered layers in FIG. 4. In another embodiment, the patch combined tapered and non-tapered layers.

In use, first, the conduit to be rehabilitated is assessed to locate protrusions into the pipe. Then, patches are installed around each of the protrusions.

From this point, any method for installing a cured-in-place liner may be used, as long as the curing step also cures the epoxy used in the patch. In one example, a liner, consisting of at least two concentric tubular jackets (an outer and an inner jacket) made of a flexible material that is capable of being impregnated with epoxy is provided. Bonded to the inner surface of the inner jacket is a film that is impermeable to the liquid to flow through the conduit. A curable adhesive resin—a part of epoxy—is injected between the two tubular jackets. The epoxy is impregnated into the tubular jackets using a syringe. The liner is inserted into one end of a dry conduit and then pulled into place. The liner is then filled with cold water. A shaping step then occurs, where the liner is made to conform to the inner wall of the conduit, typically by sending a sponge through the liner. The liner is then cured in place by flowing heated water through the conduit. This causes the epoxy and thus the liner to become a rigid structure, bonded to the inner surface of the conduit. The liner is then opened.

Figure 6:
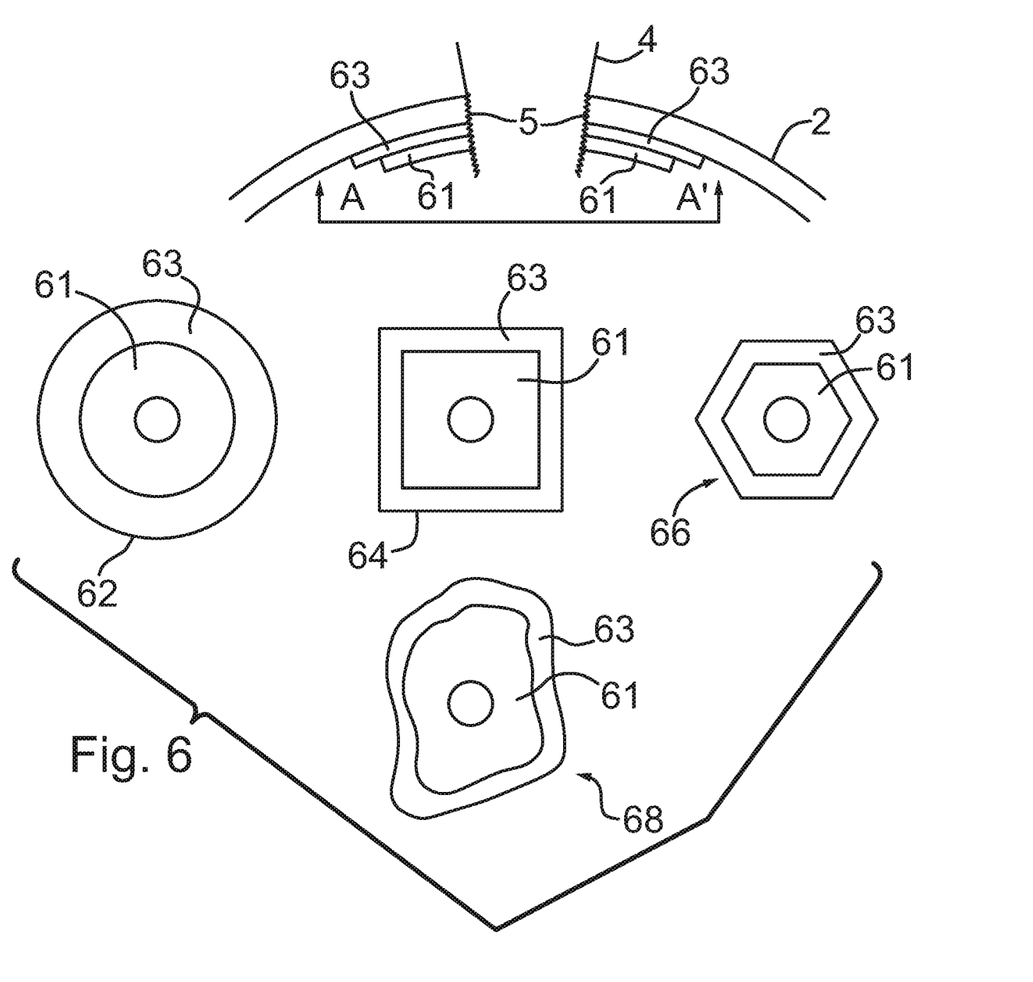
FIG. 6 illustrates several embodiments of patches with different geometrical shapes.

Another aspect of this method is installation of the protrusion patch before the installation of the cured-in-place liner. The patches have to be installed from inside a pipe, and therefore the space for the installation tool is limited. Depending upon the installation tool, different geometries of the patch (or patch layers) can be beneficial. Turning to FIG. 6, several embodiments of patches with an inner layer 61 and an outer layer 63 are illustration taken along a line A-A'. Patch 62 is circular in geometry. Patch 64 is square in geometry. Patch 66 is hexagonical in geometry. Many different geometries can be used. The geometries do not have to be symmetrical or regular: patch 68 is a random asymmetrical shape.

Although not illustrated, a patch could be constructed using layers with different geometries (i.e. the first layer could be circular while the second layer is a square). However, it is believed that the patch will work better with the same or similar geometry for all layers.

The different geometries may be advantageous in the installation of the patches, depending upon the installation tool used. Recall that the patch should be installed to fit snugly against threads 5. This may require the application of torque, which for some installation tools is more easily applied to a corner of the patch or using a straight edge of the patch.

Since the patches have to be installed inside a pipe, an installation tool is maneuvered and operated inside the pipe by remote control.

Figure 7:
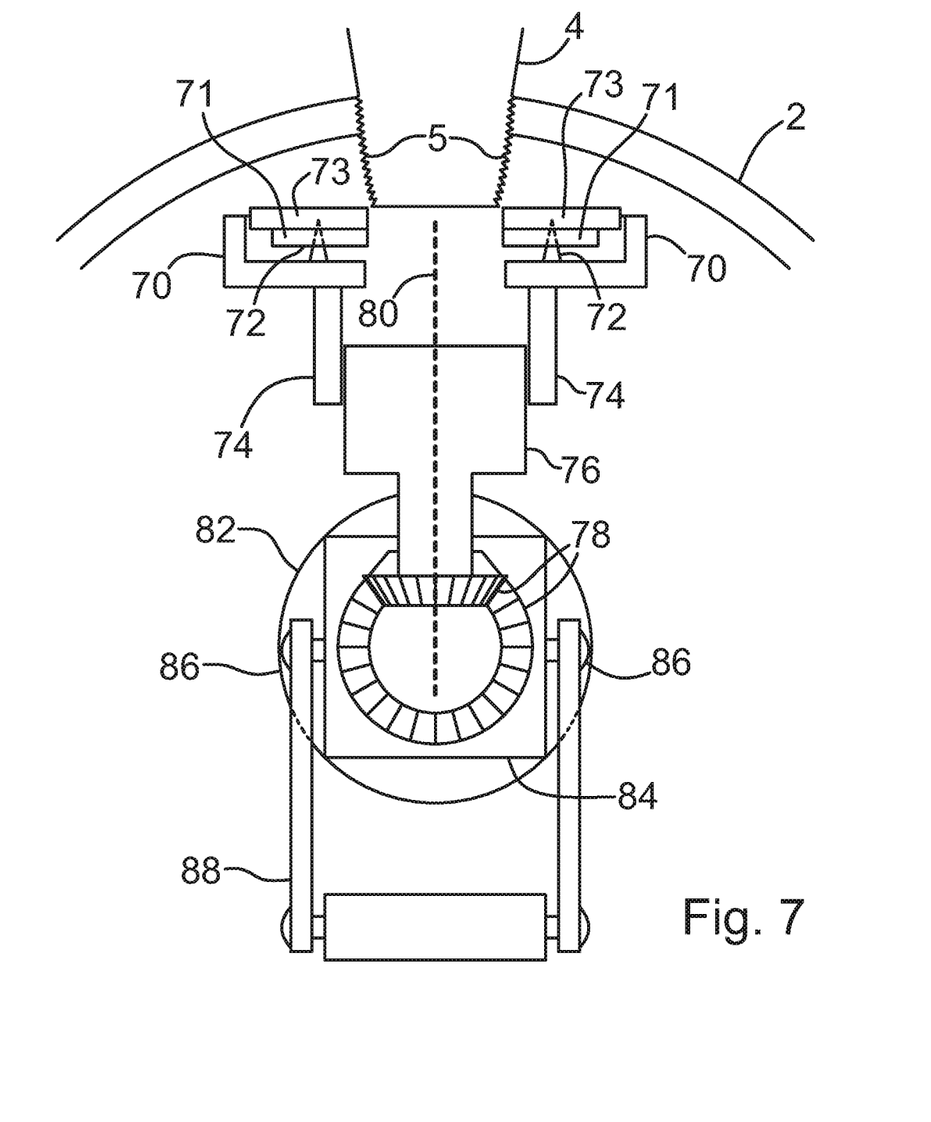
FIG. 7 illustrates a device for installing the patches using needles and rotation.

FIG. 7 shows an installation tool. Turning to FIG. 7, there is a patch with inner layer 71 and outer layer 73. The installation tool has holder 70, patch tooling needles 72, collet for the tool holder 74, vertical spindle 76, miter gears 78, axis of rotation 80 (for spindle 76), a motor 82, a housing for the gear train assembly 84, shoulder bolts 86, and links for lifting 88. Patch tooling 72 are needles, which pierce into the patch to be installed. In use, the patch is elevated while being turned, thus engaging the threads 5 of service 4 with the flexible material in the patch.

This installation tool will work with any geometry of patch, since the needles 72 pierce into the patch to turn it. Note that the holes in the patch created by needles 72 are exterior to the cured pipe, and so the holes in the patch should not hinder the function or water-tightness of the cured pipe.

In a preferred embodiment, as part of the rotation the patch is pushed against the inner surface of the conduit, squeezing the patch and spreading the epoxy.

Figure 8:
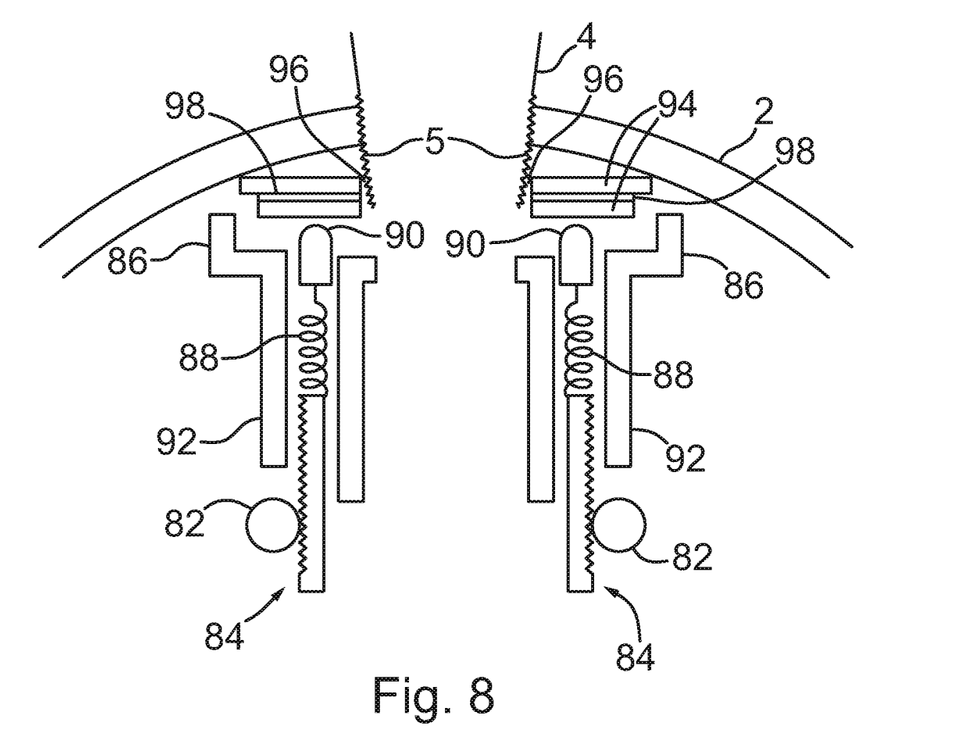
FIG. 8 illustrates a device for installing the patches using a push mechanism.

An alternative installation tool is illustrated in FIG. 8. Turning to FIG. 8, there are rack and pinion gear 82, rack 84, patch holder 86, spring 88, pin to disengage patch 90, and tooling holder 92. As long as the size of the hole in the patch 94 is closely matched to the outer diameter of the service 4, the flexible material in the patch 94 will interface with threads 5.

In an alternative embodiment, if the hole in the patch 94 does not fit snugly against threads 5, a small gap 96 will exist between the patch 94 and threads 5, and during installation of the cured-in-pipe liner this gap 96 should be filled with cured epoxy. This tool facilitates this; when pins 90 push up to disengage patch 94, they will squeeze the patch and epoxy 98 will in turn be squeezed out into small gap 96.

Note that in an alternative embodiment, pins 90 may be a ring, or any other geometry that is pressed upwards.

Note that by pressing upwards on the patch (whether using the installation tool in FIG. 8 or the installation tool in FIG. 7, 9 or 10*a*-10*c*) the patch is pressed towards or ideally against the inner wall of the conduit, lessening void space and increasing the quality of the overall installation.

Figure 9:
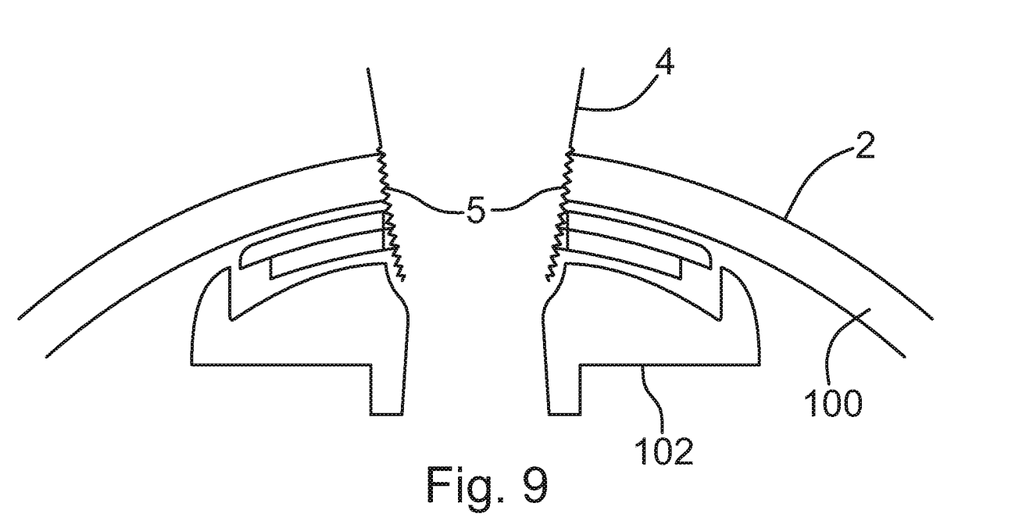
FIG. 9 illustrates a device for installing the patches that is curved to reflect the inner curvature of the conduit.

In the case of a small diameter pipe to be rehabilitated, the curve of the pipe itself may impede the upward motion of the installation tool. To accommodate smaller diameter pipes, the installation tool may be modified as seen in FIG. 9. Turning to FIG. 9, there is an inner wall 100 of the host pipe. Curved tooling 102 is used so that the patch may be more completely pushed up the service connection.

Figure 10A:
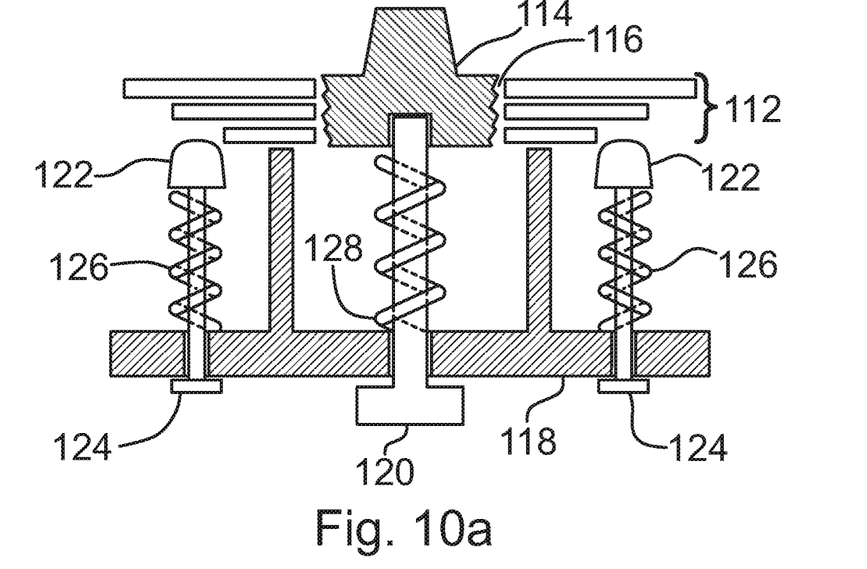
FIG. 10*a* illustrates a device for installing the patches that uses a push mechanism and a guide to center the device on a service.
Figure 10B:
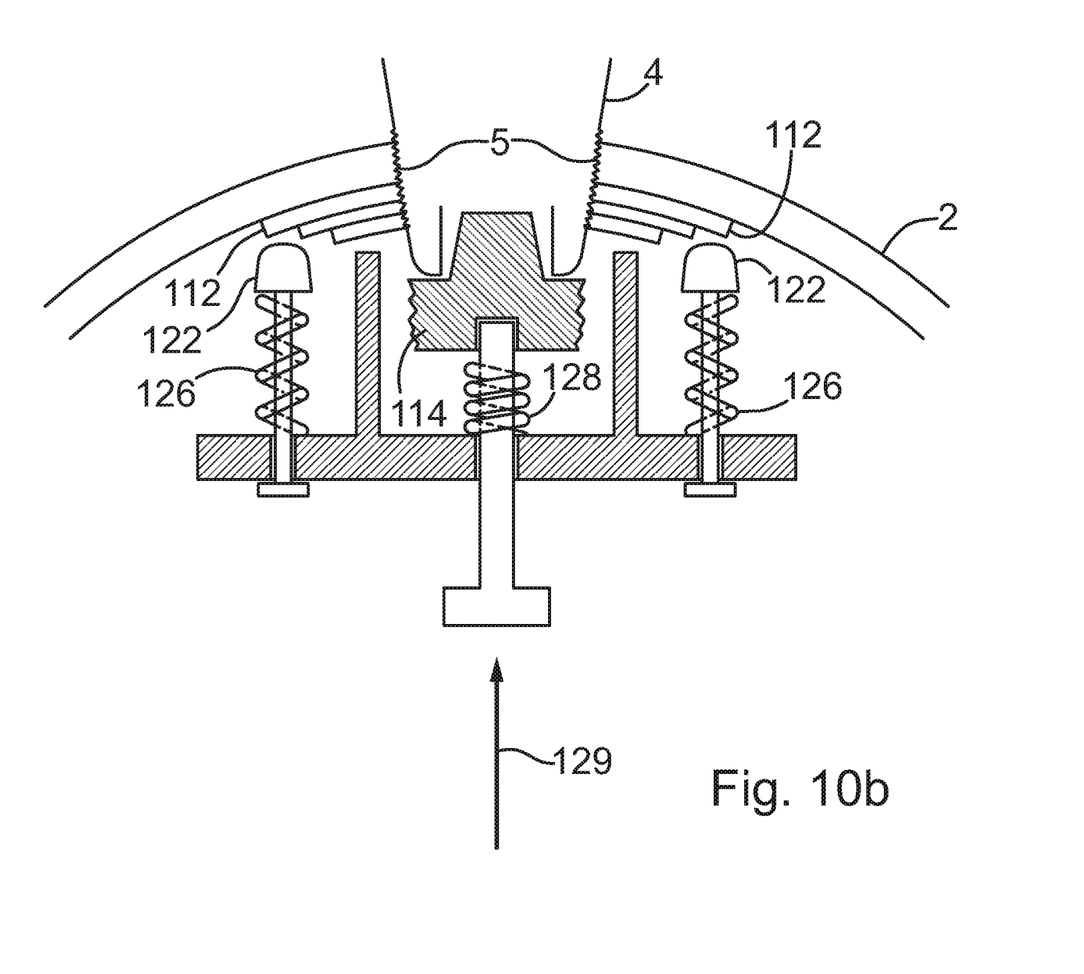
FIG. 10*b* illustrates the use of the device of FIG. 10*a*.
Figure 10C:
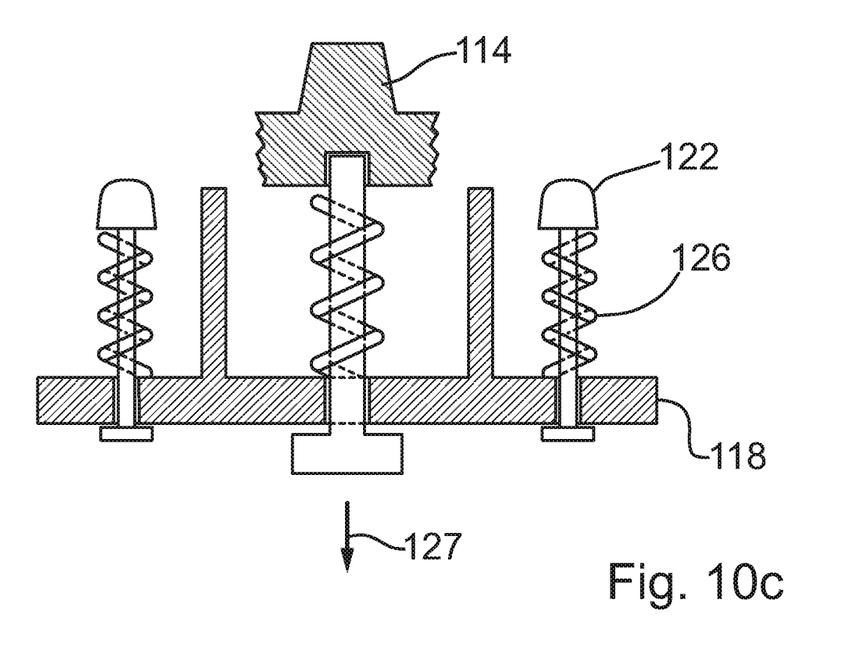
FIG. 10*c* illustrates the removal of the device of FIG. 10*a* after use.

Another embodiment of an installation tool that is pushed onto the protrusions illustrated in FIGS. 10*a*-10*c*. Turning to FIG. 10*a*, there is a patch 112. There is a grooved holder 114 that holds the patch 112. Grooved holder 114 is sized so that grooves 116 are larger than the inner diameter of patch 112 (including all layers of patch 112) so that grooves 116 interface with patch 112 (in FIG. 10*a* the patch 112 and grooves 116 are shown with a gap for clarity). Base 118 acts as a platform and supports grooved holder 114 through screw 120. Base 118 also supports pins 122 through screw 124. Spring 126 biases pin 122 away from the base 118; spring 128 biases grooved holder 114 away from base 118.

FIG. 10*b* shows the application of the patch. Turning to FIG. 10*b*, the device moves in direction 129, and patch 112 is pushed onto threads 5. Grooved holder 114 is tapered so that holder 114 can be used to locate service 4 and centre the device in the service. Springs 126 and 128 compress, creating pressure to push patch 112 up the service and off grooved holder 114 onto threads 5. The flexible material in the patch 112 should engage with the threads 5. Please note that the outer diameter of grooved holder 114 (i.e. grooves 116) is sized to be slightly smaller than or the same size as the diameter of the bottom of service 4.

FIG. 10*c* shows the removal of the device. Turning to FIG. 10*c*, the device moves in direction 127. The springs 126 and 128 return to a relaxed position, and the device is ready to use for another installation.

FIGS. 10*a*-10*c* show two pins 122. In alternative embodiments, a plurality of pins 122 can be used, and at a minimum a sufficient number of pins 122 should be used to provide a relatively constant pressure around the circumference of the service 4, and to push the patch 112 against the inner surface of pipe 2. The springs 126 should have a greater spring constant than spring(s) 128.

Figure 11:
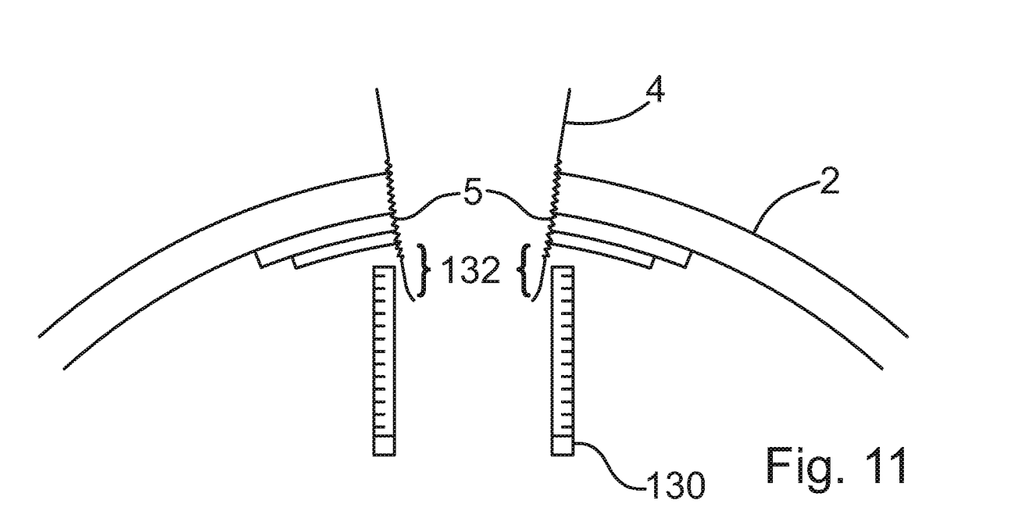
FIG. 11 illustrates the measurement of the quality of the installation of the patch on the services before installation of the cured-in-place structural liner.

Finally, it would be desirable to verify the quality of the installation of the patch before the cured-in-pipe process is applied. Turning to FIG. 11, there is a measurement tool 130, which fits around the external wall of the service. In its simplest form, this tool measures the distance 132 up the service the patch has been pushed. The measure of quality of the installation would be the difference between the length that the service protrudes into the pipe before installation of the patch and length 132. Alternatively, tool 38 can measure the number or length of the threads in area 132 (and optionally compare that to the length of the threads on the portion of the service protruding into the conduit before installation of the patch). These measurements can be implemented using several methods known to persons skilled in the art, for example using devices used in the automotive industry. One example of such a device would be a miniature camera with a very small focal length which is placed close to the threads to check thread depth of a screw into a tapped hole. An alternative device uses a physical probe as a depth gauge to extrapolate the number of threads that can be engaged based on the known thread pitch and distance of which the depth gauge hits a hard stop. Tool 38 can also be used as a transparent sight tube, where markings placed on the tool 38 are used as a reference and the obstruction inside is compared against the closest mark, typically by using a camera.

FIGS. 1 through 12 are conceptual illustrations allowing for an explanation of the present invention. Those of skill in the art should understand that various aspects of the embodiments of the present invention could be implemented using different materials, fasteners and minor design modifications. Notably, the figures and examples above are not meant to limit the scope of the present invention to a single embodiment, as other embodiments are possible by way of interchange of some of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention.

In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A rehabilitated conduit having a service connected into the conduit and protruding into the conduit comprising:
   a liner made of a first flexible material impregnated with a first curable epoxy and having a film made of a material impermeable to liquid bonded onto the inner surface of the liner, the liner being bonded to the inner surface of the conduit;
   a patch comprising at least one piece of a second flexible material impregnated with a second curable epoxy, the patch having a hole pierced through and the patch being placed to form a ring around the service, said hole closely matching the diameter of the service;
   said first curable epoxy and said second curable epoxy having been cured;
   said patch being bonded to the liner and the service.

2. The rehabilitated conduit of claim 1 where there are at least two pieces of the second flexible material and the at least two pieces of the second flexible material are stacked and have an equal or decreasing diameter of the layers moving down the service, thus forming a pyramidal shape.

3. The rehabilitated conduit of claim 2 where at least one edge of at least one of the second flexible pieces of material is tapered.

4. The rehabilitated conduit of claim 2 where the at least two pieces of the second flexible material are made from the same material as the liner.

5. The rehabilitated conduit of claim 1 where the patch, liner and service form a unitary structure.

6. The rehabilitated conduit of claim 2 where the patch, liner and service form a unitary structure.

7. A rehabilitated conduit having a service with an external thread connected into the conduit and protruding into the conduit comprising:
   a liner made of a first flexible material impregnated with a first curable epoxy and having a film made of a material impermeable to liquid bonded onto the inner surface of the liner, the liner being bonded to the inner surface of the conduit;
   a patch comprising at least one piece of a second flexible material impregnated with a second curable epoxy, the patch having a hole pierced through and the patch being placed to form a ring around the service, the diameter of said hole being sized between the major diameter and minor diameter of the thread;
   said first curable epoxy and said second curable epoxy having been cured;
   said patch being bonded to the liner and the service.

8. The rehabilitated conduit of claim 7 where there are at least two pieces of the second flexible material and the at least two pieces of the second flexible material are stacked and have an equal or decreasing diameter of the layers moving down the service, thus forming a pyramidal shape.

9. The rehabilitated conduit of claim 8 where at least one edge of at least one of the second flexible pieces of material is tapered.

10. The rehabilitated conduit of claim 8 where the at least two pieces of the second flexible material are made from the same material as the liner.

11. The rehabilitated conduit of claim 7 where the patch, liner and service form a unitary structure.

12. The rehabilitated conduit of claim 8 where the patch, liner and service form a unitary structure.

13. A rehabilitated conduit having a service having an external thread connected into the conduit and protruding into the conduit comprising:
   a liner made of a first flexible material impregnated with a first curable epoxy and having a film made of a material impermeable to liquid bonded onto the inner surface of the liner, the liner being bonded to the inner surface of the conduit;
   a patch comprising at least one piece of a second flexible material impregnated with a second curable epoxy, the patch having a hole pierced through and the patch being placed to form a ring around the service, the diameter of said hole being sized so the second flexible material engages with the thread when the patch is rotated onto the thread;
   said first curable epoxy and said second curable epoxy having been cured;
   said patch being bonded to the liner and the service.

14. The rehabilitated conduit of claim 13 where there are at least two pieces of the second flexible material and the at least two pieces of the second flexible material are stacked and have an equal or decreasing diameter of the layers moving down the service, thus forming a pyramidal shape.

15. The rehabilitated conduit of claim 14 where at least one edge of at least one of the second flexible pieces of material is tapered.

16. The rehabilitated conduit of claim 13 where the at least two pieces of the second flexible material are made from the same material as the liner.

17. The rehabilitated conduit of claim 14 where the patch, liner and service form a unitary structure.

* * * * *